(12) United States Patent
Kidwell

(10) Patent No.: US 7,011,046 B1
(45) Date of Patent: Mar. 14, 2006

(54) DEVICE FOR COLLECTING PET HAIR

(76) Inventor: Jack Randall Kidwell, P.O. Box 123, Spavinaw, OK (US) 74366

( * ) Notice: Subject to any disclaimer, the term of this patent is extended or adjusted under 35 U.S.C. 154(b) by 0 days.

(21) Appl. No.: 11/011,403

(22) Filed: Dec. 14, 2004

(51) Int. Cl.
*A01K 13/00* (2006.01)

(52) U.S. Cl. ..................... 119/678; 119/657

(58) Field of Classification Search ............. 119/678, 119/600, 601, 606, 650, 651, 652, 656, 657, 119/666, 667, 668, 671, 472
See application file for complete search history.

(56) References Cited

U.S. PATENT DOCUMENTS

| | | | |
|---|---|---|---|
| 3,574,885 A | | 4/1971 | Jones |
| 4,301,766 A | * | 11/1981 | Piccone ..................... 119/482 |
| 4,729,147 A | * | 3/1988 | Armbruster ................. 15/314 |
| 4,938,169 A | | 7/1990 | Barmakian |
| 5,351,646 A | | 10/1994 | Zoroufy |
| 5,513,598 A | * | 5/1996 | Zapparoli ................... 119/600 |
| 5,540,186 A | | 7/1996 | Udelle |
| 5,546,895 A | | 8/1996 | Brown |
| 5,655,481 A | | 8/1997 | Trahan |
| 5,755,183 A | | 5/1998 | Udelle et al. |
| 5,782,206 A | | 7/1998 | Markowitz |
| 5,842,440 A | | 12/1998 | Bell, Jr. |
| 5,845,604 A | * | 12/1998 | Cucchi et al. .............. 119/673 |
| 5,946,768 A | * | 9/1999 | Kelly .......................... 15/315 |
| 5,957,090 A | | 9/1999 | Larson |
| 5,964,189 A | * | 10/1999 | Northrop et al. ........... 119/482 |
| 6,698,384 B1 | | 3/2004 | Markowitz |

FOREIGN PATENT DOCUMENTS

GB  2144317 A  *  3/1985

* cited by examiner

*Primary Examiner*—Yvonne R. Abbott
(74) *Attorney, Agent, or Firm*—Molly D. McKay

(57) ABSTRACT

A device for automatically collecting loose pet hair, debris and allergens from a pet as the pet enters or leaves the device where the pet is fed, thus keeping the pet owner's house cleaner. The device is a container consisting of three interconnected compartments. Loose particles are removed from the pet by air suction as the pet passes through collector plate assemblies in the first compartment to reach its food in the second compartment. A fan that induces the air suction in the first compartment and the filter that removes the hair from the air stream are both located in the third compartment. A sensor in the second compartment signals a receiver associated with the fan to turn the fan on and off based on the presence of an animal within the device. An optional second exit with a one way door can be provided in the second compartment.

13 Claims, 2 Drawing Sheets

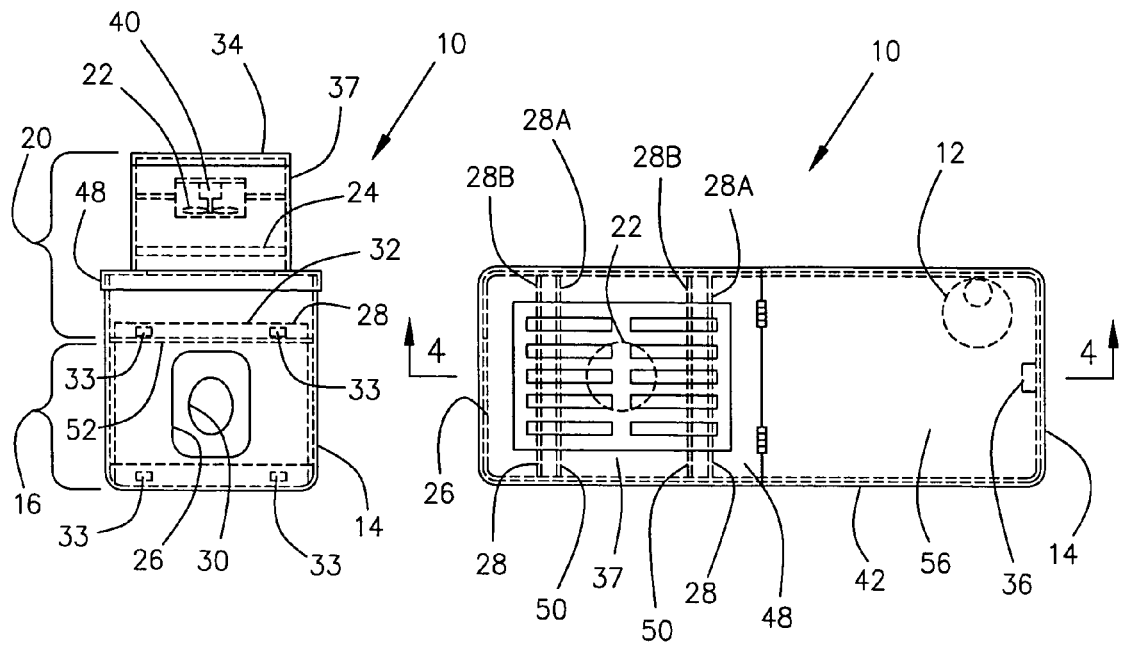
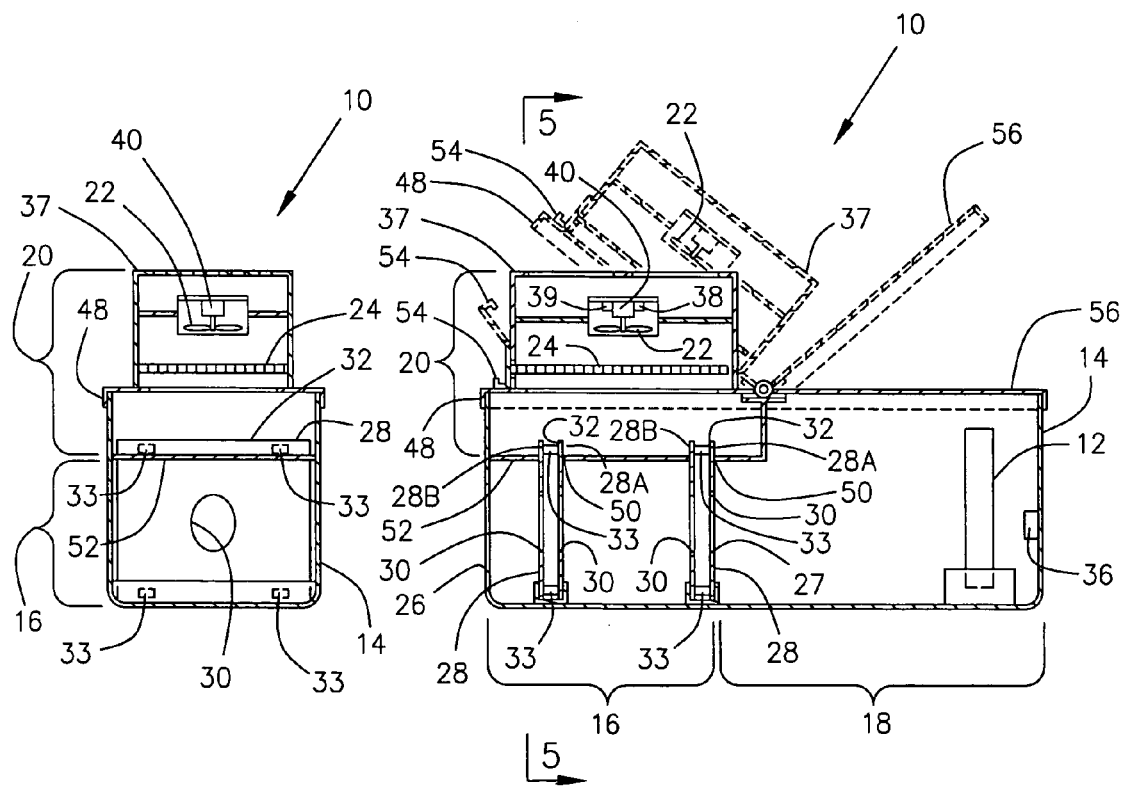

DEVICE FOR COLLECTING PET HAIR

BACKGROUND OF THE INVENTION

1. Field of the Invention

The present invention relates to a device for collecting pet hair directly from the pet as the pet enters or leaves the device where the pet eats, thus preventing or greatly reducing the amount of hair that the pet sheds in the house.

2. Description of the Related Art

A large number of people keep a pet of some kind in their house. Most of these pets are either cats or dogs. One of the problems that most pet owners experience is the presence of pet hair in their house due to their pet or pets shedding hair. This loose hair accumulates on the floor and can become unsightly. If the house is not cleaned frequently, the accumulation of hair can clog the return air filters of HVAC systems and can accumulate on refrigerator coils and decrease the refrigerator's cooling efficiency. Also, the human occupants may be allergic to the accumulation of hair and dander, not to mention the problem of pet hair getting on the human's furniture, carpet and clothing. The pet may also carry allergens, such as pollen, on its coat which would also be removed or at least reduced by the present invention. This removal or reduction in allergens on the pet's coat can reduce allergic reactions for both the pet and the pet's owners, particularly if the pet sleeps in the same bed with the pet's owners. The device could also aid in removing other debris that may be entangled in the pet's coat, such as dried leaves, grass, etc. and thus aid in keeping this type of debris from being scattered by the pet in the pet owner's house.

Although there are certain breeds of dogs and cats that do not shed much hair, the majority of the common dog and cat breeds do shed at least some hair and many shed a great deal of hair.

There are a number of hand held devices available for addressing this problem, including brushes, combs, portable vacuums, etc. that are used to clean loose hair from animals. These devices and methods are manually operated, time consuming and generally messy.

It is clear that there is a need for an improved automatic apparatus to remove and contain loose animal hair from pets so that the hair can be disposed.

The present invention relates to a device for collecting pet hair directly from the pet as the pet enters or leaves the device where the pet eats, thus preventing or greatly reducing the amount of hair that the pet sheds in the house. The device is a container consisting of three compartments: a first compartment where loose hair is removed from the pet, a second compartment where the pet is fed, and a third compartment where the filter and fan are housed.

It is a primary object of the present invention to provide an improved device for automatically removing loose hair from pets and retaining that loose hair so that it can be properly disposed.

A further object of the present invention is to provide an automated device for removing loose hair and allergens from pets to produce a cleaner and healthier environment for both the pets and the pet owners.

Another object of the present invention is to provide a device for cleaning loose pet hair from a pet that can be adjusted in size to fit a variety of sizes of the animals.

Still another object of the present invention is to provide a device for cleaning the pet which is safe for the pet and which is inviting to the pet to induce the pet to enter the device frequently.

A further object of the present invention is to provide an automatic device for cleaning a pet that has a small number of readily accessible components so that the device is simple and inexpensive to make and maintain.

SUMMARY OF THE INVENTION

The present invention is a device for collecting pet hair directly from the pet as the pet enters or leaves the device where the pet eats, thus preventing or greatly reducing the amount of hair, debris or allergens that the pet sheds or spreads in the pet owner's house. The device is a container consisting of three compartments: a first compartment where loose hair is removed from the pet by air suction, a second compartment where the pet is fed, and a third compartment which houses the fan that induces the air suction in the first compartment and also houses the filter on which the loose hair is collected.

The first compartment is where loose hair is removed from the animal. This first compartment has an opening to the outside through which the pet enters and exits the device and an opening into the second compartment so that the pet can pass through the first compartment in order to enter the second compartment where there is food. The first compartment is provided internally with collector plate assemblies that have open sides that extend into a third compartment. The fan located in the third compartment pulls air from the first compartment through the collector plate assemblies into the third compartment in a manner similar to a vacuum cleaner. Each of the collector plate assemblies is comprised of two spaced apart plates that form walls between which the air suction is conveyed. Each of the two plates is provided with an opening there through to allow the pet to pass though the openings in the plates of the collector plate assemblies. In so passing through the collector plate assemblies, suction of air is applied 360 degrees around the pet, thereby pulling loose hair and debris from all areas of the pet's body as the pet passes through the openings provided in the collector plate assemblies. The loose hair and debris is pulled by suction into the third compartment where a filter is provided for collecting the loose hair.

The second compartment is simply a compartment into which the pet goes to eat. This second compartment is provided with a pet feeder containing pet food and is to be the place where the pet is fed on a regular basis. The presence of food induces the pet to frequently enter the device. The second compartment is also provided with a sensor, such as a motion sensor, that points in the direction of the first compartment and senses when the pet is entering the device. When the sensor is activated by the entrance of the pet into the device, the sensor sends a signal to a receiver provided in the third compartment. When the receiver receives the signal from the sensor, it in turn activates a fan motor that starts the fan blowing. This creates a flow of air through the collector plate assemblies in the first compartment to thereby remove the loose hair from the pet as the pet enters and leaves the device. The sensor functions to turn off the fan and thereby end the flow of air through the collector plate assemblies by ending the signal to the receiver when it no longer detects the presence of the pet within the device. A time delay mechanism is provided in association with the receiver so that the time delay mechanism continues to operate the fan for a short period of time after the signal to the receiver ends. This allows air to continue flowing from the first compartment through the collector plate assemblies and through the filter for a short time after the pet exits the device.

Optionally, the wall of the second compartment may be provided with an exit only opening. An exit only opening may be desirable if the household has multiple pets that will be using the device as it provides a means of escape for one animal that is in the second compartment when a second animal starts to enter the device via the first compartment. The optional exit only opening, when employed, will be provided with a one way door which will allow a pet to exit through the exit only opening but will not let a pet enter the device via the exit only opening. This one way door will prevent animals from circumventing the purpose of the device by preventing them from both entering and exiting the device without passing through the first compartment.

The third compartment adjoins the first compartment and is preferable located either above or to the side of the first compartment so that the two compartments are provided with a common wall separating them and through which open sides of the collector plate assemblies can extend via assembly openings provided in the common wall. The third compartment houses a fan which pulls air from the first compartment through the collector plate assemblies and then through the filter located in the third compartment. The filter is provided in the third compartment between the open sides of the collector plate assemblies and the fan. The filtered air leaving the filter passes through the fan before exiting the device via a discharge grill provided in the wall of the third compartment. A fan motor is also provided in association with the fan within the third compartment as well as the receiver and time delay mechanism.

The device is provided with a first hinged lid providing access to the third compartment, an access flap providing access to the filter, and a second hinged lid providing access to the second compartment. Access to the third compartment can be obtained, when necessary to service the fan or fan motor, by removing the discharge grill from the device.

BRIEF DESCRIPTION OF THE DRAWINGS

FIG. 2 is a cross sectional view of the device of FIG. 1 taken along line 2—2.

FIG. 3 is a top plan view of the device of FIG. 1 taken along line 3—3.

FIG. 4 is a cross sectional view of the device of FIG. 3 taken along line 4—4.

FIG. 5 is a cross sectional view of the device of FIG. 4 taken along line 5—5.

DETAILED DESCRIPTION OF THE PREFERRED EMBODIMENT THE INVENTION

Figure 1:
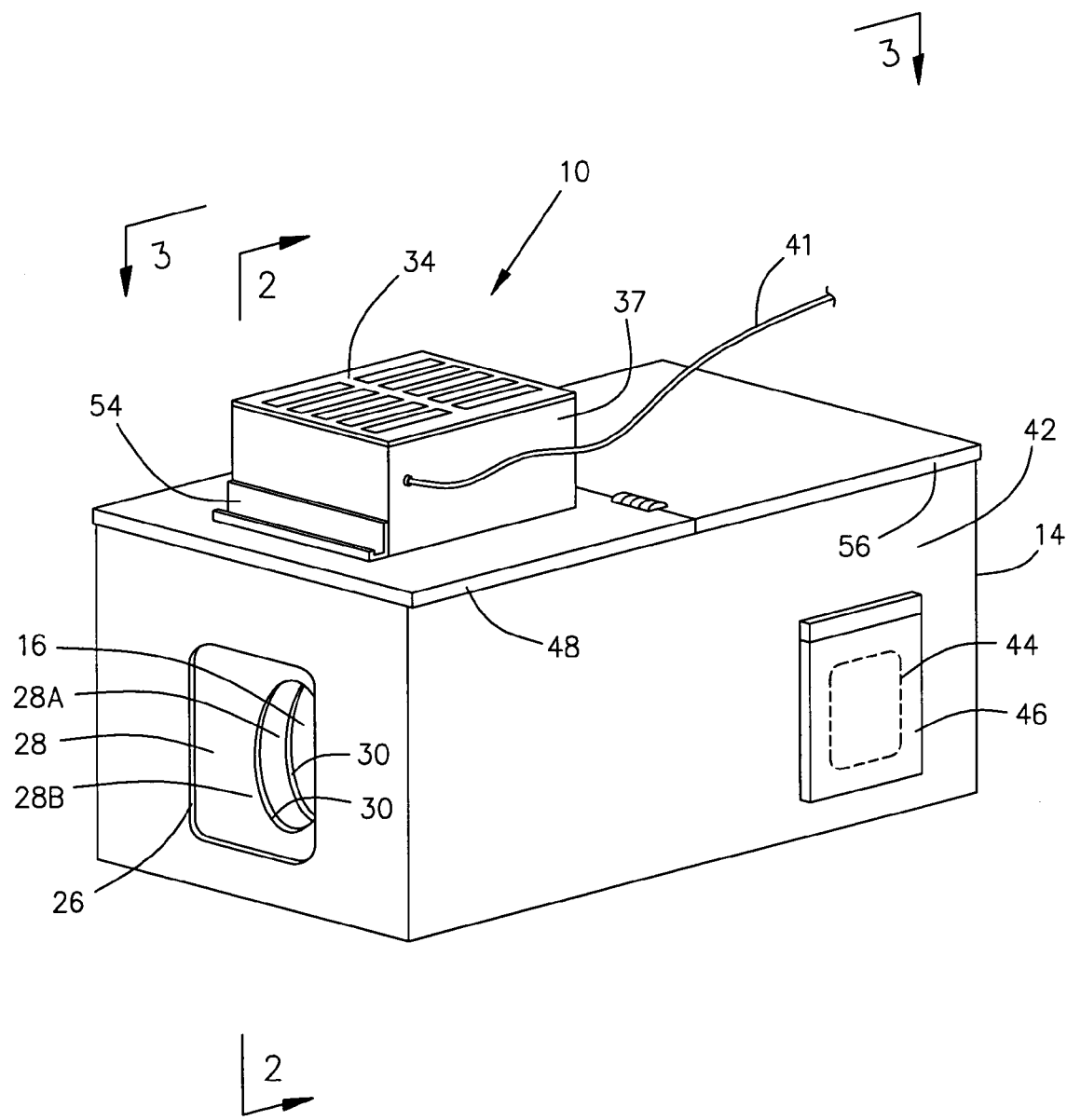
FIG. 1 is a perspective view of a device for collecting pet hair constructed in accordance with a preferred embodiment of the present invention.

Referring now to FIG. 1, there is illustrated a device for collecting pet hair 10 constructed in accordance with a preferred embodiment of the present invention. The device 10 is designed to directly remove loose hair and other items that cling to the pet's coat from the pet as the pet enters or leaves the device 10. The pet is induced to enter the device 10 because the pet's food is maintained in a feeder 12 located inside the device 10. By applying a vacuum to the pet's body as the pet passes through the device 10, this prevents or greatly reduces the amount of hair, debris or allergens that the pet sheds or spreads in the pet owner's house.

Referring now to FIG. 4, the device 10 is a container 14 consisting of three compartments 16, 18, and 20. The first compartment 16 is where loose hair is removed from the pet by air suction, the second compartment 18 where the pet's feeder 12 is located, and the third compartment 20 houses a fan 22 that induces the air suction in the first compartment 16 and houses an air filter 24 on which the loose hair that has been pulled off of the pet in the first compartment 16 is to be collected.

As shown in FIGS. 1–5, the first compartment 16 is where loose hair is removed from the animal. This first compartment 16 has an opening 26 to the outside through which the pet enters and exits the device 10. The first compartment 16 also has a second opening 27 that is located between the first and second compartments 16 and 18 so that the pet can pass into the second compartment 18 by first passing through the first compartment 16. The first compartment 16 is provided internally with collector plate assemblies 28 that are continuous internally with the third compartment 20. Air is pulled through the two plates 28A and 28B comprising each of the collector plate assemblies 28 into the third compartment 20 in a manner similar to a vacuum cleaner by the fan 22 that is provided in the third compartment 20. Each of the collector plate assemblies 28 is comprised of two spaced apart plates 28A and 28B between which the air suction is conveyed from the first compartment 16 to the third compartment 20. The two plates 28A and 28B of each collector plate assembly 28 are each disposed across the first compartment 16 so that each plate 28A and 28B completely partition the first compartment 16 between the opening to the outside 26 and the second opening 27 leading to the second compartment 18. The pairs of plates 28A and 28B are each provided with an opening 30 there through to allow a pet to pass though the pairs of plates 28A and 28B that form the collector plate assemblies 28.

In order to customize the device 10 to match the size of the pet, the pairs of plates 28A and 28B are replaceable with other replacement plates (not illustrated) that having openings 30 of a different and proper size to just barely allow the pet to pass through them. By employing collector plate assemblies 28 with the proper side of openings 30 in the pairs of plates 28A and 28B, the efficiency of the device 10 in removing loose hair and other items from the pet's body can be maximized.

Air passes around the pet's body as the pet passes through the openings 30 in the plates 28A and 28B and is then pulled, along with any loose hair or debris that has been pulled off of the pet, between the two plates 28A and 28B of each collector plate assembly. The openings 30 allow the fan 22 to pull a suction of air in 360 degrees around the pet's body. This 360 degree air flow pulls loose hair from all areas of the pet's body as the pet passes through the openings 30 provided in the collector plate assemblies 28. The loose hair is pulled by the suctioning air flow out open side 32 of the plate assemblies 28 and into the third compartment 20 where the air filter 24 is located. Spacers 33 hold the plates 28A and 28B in spaced apart orientation relative to each other. The air filter 24 is provided in the third compartment 20 so that it extends across the air pathway and functions to separates the entrained hair and debris from the air stream as the air passes through the filter 24. Hair and debris are collected on the filter 24 and the filter 24 is periodically cleaned or replaced by the pet owner. After the air flows through the filter 24, it is pulled through the fan 22 and then exits the device 10 via the discharge grill 34 provided in a wall 37 of the third compartment 20.

The second compartment 18 is simply an area into which the pet goes to eat its food. This second compartment 18 is provided with a pet feeder 36 that is filled with pet food and is the place where the pet will be fed on a regular basis. The presence of food induces the pet to frequently enter the device 10 via the first compartment 16. The second compartment 18 is also provided with a sensor 36, such as a motion sensor, that points in the direction of the first compartment 16 and senses when the pet is entering the device 10 via the first compartment 16. When the sensor 36 detects a pet, it is activated by the entrance of the pet into the device 10. This causes the sensor 36 to send a signal to a receiver 38 provided in the third compartment 20 in association with the fan motor 40. This in turn activates the fan motor 40 and its associated fan 22 to start the flow of air through the collector plate assemblies 28 in the first compartment 16 to thereby remove the loose hair from the pet as the pet enters and leaves the device 10. The sensor 36, the receiver 38, and the time delay mechanism 39 can each be either battery powered or powered by attachment via power cords (not illustrated) to a standard electrical power outlet (also not illustrated). As shown in FIG. 1, the fan motor 40 is preferably provided power via a power cord 41 that attaches to a standard electrical power outlet (not illustrated).

The fan 22 will remain on as long as the sensor 36 detects the presence of an animal in the device 10. The sensor 36 also functions to turn off the flow of air through the collector plate assemblies 28 by ceasing to send a signal to the receiver 38 when it no longer detects the presence of the pet within the device 10. A time delay mechanism 39 is provided in association with the receiver 38 so that the air flow continues in the first compartment 16 for a short time after the pet exits the device 10. This allows any hair removed from the pet's body as the pet exits to have sufficient time to be transported and caught on the filter 24 before the air flow ends.

Optionally, as illustrated in FIG. 1, a side wall 42 of the second compartment 18 may be provided with an exit only opening 44. An exit only opening 44 may be desirable if the household has multiple pets since the exit only opening 44 will be used as a means of escape for one animal that is in the second compartment 18 when a second animal starts to enter the device 10 via the first compartment 16. The optional exit only opening 44 will be provided with a one way door 46 which will allow a pet to exit through the exit only opening 44 but will not let a pet enter the device 10 via the exit only opening. This one way door 46 will prevent animals from circumventing the purpose of the device 10 by preventing them from both entering and exiting the device 10 without passing through the first compartment 16.

The third compartment 20 adjoins the first compartment 16 and is preferable located either above or to the side of the first compartment 16. This third compartment 20 houses the fan 22, the fan motor 40, the receiver 38, the time delay mechanism 39, and the filter which is located between the open sides 32 of the collector plate assemblies 28 and the fan 22.

The device 10 is provided with a first hinged lid 48 that opens up the third compartment 20 to provide access to the collector plate assemblies 28 in order to replace them. The collector plate assemblies 28 insert through assembly openings 50 provided in a common wall 52 located between the first and third compartments 16 and 20. The device is also provided with a filter access flap 54 that provides access to the filter 24 in order to remove and replace the filter 24. The device also has a second hinged lid 56 that provides access to the second compartment 18 to allow the feeder 12 to be cleaned or refilled with food. When necessary to service the fan 22, the fan motor 40, the receiver 38 or the time delay mechanism 39, the discharge grill 34 can be removed from the wall 37 of the third compartment 20 where it is normally secured, thereby providing access to a portion of the third compartment 20 located between the filter 24 and the discharge grill 34.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A device for collecting pet hair directly from a pet as the pet enters or leaves the device comprising:
   a container having a first compartment where loose hair is removed from a pet by air suction,
   said container having a second compartment where the pet is fed, and
   said container having a third compartment which houses a fan that induces the air suction in the first compartment and which houses an air filter on which loose hair that has been removed from the pet is collected,
   said container provided with an opening to the outside that communicates with the first compartment and through which a pet enters and exits the container, and
   said container provided with an opening located between the first and second compartments through which a pet passes from the first compartment to the second compartment.

2. A device for collecting pet hair directly from a pet as the pet enters or leaves the device according to claim 1 further comprising:
   food provided in the second compartment to induce a pet to enter the second compartment.

3. A device for collecting pet hair directly from a pet as the pet enters or leaves the device according to claim 1 further comprising:
   said first compartment provided internally with collector plate assemblies that have open sides that extend into said third compartment,
   each said collector plate assembly provided with two spaced apart plates that form walls between the first and second compartments, each said plate provided with an opening therein to allow a pet to pass through the plates as the pet passes through the first compartment on its way to the second compartment,
   air suction created by the fan pulling air from the first compartment into the third compartment via the spaced apart plates of the collector plate assemblies, and
   the air filter located in the third compartment between the fan and the collector plate assemblies so that loose hair is removed from the air stream and retained on the filter as the air passes through the filter.

4. A device for collecting pet hair directly from a pet as the pet enters or leaves the device according to claim 3 further comprising:
   an access flap in the container to provide access to the filter in order to, clean or replace the filter when it becomes dirty.

5. A device for collecting pet hair directly from a pet as the pet enters or leaves the device according to claim 3 further comprising:

a removable discharge grill provided in the wall of the third compartment through which air passes out of the container after passing through the fan.

6. A device for collecting pet hair directly from a pet as the pet enters or leaves the device according to claim 3 wherein the first and third compartments are separated by a common wall, and the common wall is provided with assembly openings therein through which open sides of the collector plate assemblies extend into the third compartment.

7. A device for collecting pet hair directly from a pet as the pet enters or leaves the device according to claim 6 further comprising:
   a first hinged lid providing access to the third compartment for the purpose of replacing the collector plate assemblies.

8. A device for collecting pet hair directly from a pet as the pet enters or leaves the device according to claim 7 further comprising:
   a second hinged lid providing access to the second compartment.

9. A device for collecting pet hair directly from a pet as the pet enters or leaves the device according to claim 6 wherein the collector plate assemblies are replaceable by removing them via the assembly openings provided in the common wall.

10. A device for collecting pet hair directly from a pet as the pet enters or leaves the device according to claim 3 wherein the openings provided in the plates create a suction of air that is applied 360 degrees around the pet to pull loose hair and debris from all areas of the pet's body as the pet passes through the collector plate assemblies.

11. A device for collecting pet hair directly from a pet as the pet enters or leaves the device according to claim 3 further comprising:
   a sensor provided in the second compartment that is activated when it senses the presence of a pet in the container to send a signal to a receiver provided in the third compartment in association with the fan, said receiver being activated by the signal from the sensor to activate the fan and thereby start flow of air through the collector plate assemblies in the first compartment in order to remove the loose hair from the pet as the pet enters and leaves the device.

12. A device for collecting pet hair directly from a pet as the pet enters or leaves the device according to claim 11 further comprising:
   a time delay mechanism provided in association with the receiver that functions to continue to operate the fan for a short period of time after the signal from the sensor to the receiver ends due to the sensor no longer detecting the presence of a pet within the container.

13. A device for collecting pet hair directly from a pet as the pet enters or leaves the device comprising:
   a container having a first compartment where loose hair is removed from a pet by air suction,
   said container having a second compartment where the pet is fed, and
   said container having a third compartment which houses a fan that induces the air suction in the first compartment and which houses an air filter on which loose hair that has been removed from the pet is collected,
   a wall of the second compartment provided with an exit only opening therein as a means of escaping the container for an animal that is located in the second compartment when a second animal starts to enter the device via the first compartment, and
   a one way door provided on the exit only opening which will allow a pet to exit through the exit only opening but will not let a pet enter the container via the exit only opening.

* * * * *